United States Patent Office 3,500,925
Patented Mar. 17, 1970

---

3,500,925
WATER-FLOODING PROCESS FOR SECONDARY OIL RECOVERY WITH POLYMERIC N-VINYL LACTAM AND METAL SALT TO CONTROL CLAY SWELLING
John P. G. Beiswanger and Andrew Stefcik, Easton, Pa., assignors to GAF Corporation, a corporation of Delaware
No Drawing. Filed June 6, 1967, Ser. No. 643,842
Int. Cl. E21b 43/22
U.S. Cl. 166—275                     8 Claims

---

ABSTRACT OF THE DISCLOSURE

A process for improving the flow rate of injection water through oil-bearing formations containing water-sensitive clays during secondary oil recovery by including in the injection water a water soluble polymer of an N-vinyl lactam and a water soluble alkali metal salt or alkaline earth metal salt or a mixture of such salts.

---

It is well known that after crude petroleum has been pumped from oil wells by conventional methods, considerable oil remains fixed in subterranean formations. In some cases the fixed oil, i.e., remaining in the well after pumping has become unprofitable, may amount to about 60% of the original petroleum oil present. This fixed oil cannot be recovered by any of the normal primary methods used to produce the oil and recourse must be had to secondary recovery by fluid or gaseous pressure to displace the oil. The driving or displacing medium is usually injected into the formation through a well, or wells, in proximity to the producing well.

In the past, water-flooding or underground (subterranean formations, i.e., sands and similar strata) oil-bearing formations has been widely used for recovering the oil. This procedure involves the injection of water into the input wells to force the oil through the surrounding formation towards the output wells from which it can be recovered. Its principal shortcoming is that, since most of the oil sands and similar strata contain varying amounts of water-sensitive clays, the injection of water causes the clay to swell to such an extent that the formation becomes impermeable to further injection and oil recovery ceases.

The present invention is directed to an improvement of the flow rate of injection water through underground oil-bearing formations containing water-sensitive clays during the secondary recovery of petroleum oil. The injection water consists of a solution of polymeric N-vinyl lactam in water or in solution of a salt or mixture of salts in which the polymeric N-vinyl lactam controls the hydration and swelling of the water sensitive clays, thereby retaining the oil-bearing formation in a condition readily permeable to the injection water.

According to the present invention, the underground oil-bearing formation containing water-sensitive clays adjacent to an input well is treated with a flooding medium comprising an aqueous solution of polymeric N-vinyl lactam. By treating such formation surrounding the input well base with the flooding medium, a substantial increase in the injectivity rate of water or brine solution is achieved. In other words, the injectivity of the flooding medium is increased with a substantial increase in the recovery of oil. The invention thus consists of a secondary process of recovery of petroleum in which the flooding medium comprising an aqueous solution of polymeric N-vinyl lactam is injected into an input well which penetrates an oil-bearing formation and is thereafter forced through said formation towards at least one output well penetrating the said formation at a distance from the input well so as to force the oil through said formation towards an output well from which the oil is recovered by conventional means. The injection water containing the polymeric N-vinyl lactam may be injected continuously. For reasons of economy, it may be desirable to employ the aqueous solution of polymeric N-vinyl lactam as a relatively small volume slug in advance of the conventional water or water-brine flooding medium.

The polymeric N-vinyl lactams employed in the preparation of the injection water and employed in accordance with the method of the present invention are those which contain 1 or 2 carbonyl groups adjacent to the nitrogen atom in the heterocyclic moiety, such as, for example, polymers of N-vinyl succinimide, N-vinyl diglycolylimide, N-vinyl glutarimide, N-vinyl-3-morpholinone, N-vinyl-5-methyl-3-morpholinone, N-vinyl oxazolidone, and N-vinyl 5-, 6- and 7-membered lactams characterized by the following formula:

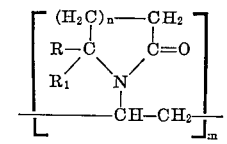

wherein R and $R_1$ are selected from the group consisting of hydrogen, methyl and ethyl, $n$ is an integer of from 1 to 3, and $m$ represents the average number of monomer units of the polymer. The molecular weight is a function of $m$ and is determined by relative viscosity measurements which are designated as K-values.

The polymers of the above illustrated monomers are readily prepared by any of the conventional polymerization procedures. The polymers of the 5-, 6- and 7-membered lactams characterized by the foregoing formula are also readily obtained by polymerizing by any of the conventional procedures such monomers as N-vinyl pyrrolidone, N-vinyl-5-methyl pyrrolidone; N-vinyl-5-ethyl pyrrolidone; N-vinyl-5,5-dimethyl pyrrolidone; N-vinyl-5,5-diethyl pyrrolidone and N-vinyl-5-methyl-5-ethyl pyrrolidone; N-vinyl piperidone; N-vinyl-6-methyl piperidone; N-vinyl-6-ethyl piperidone; N-vinyl-6,6-dimethyl piperidone; N-vinyl-6,6-diethyl piperidone and N-vinyl-6-methyl-6-ethyl piperidone; N-vinyl caprolactam, N-vinyl-7-methyl caprolactam; N-vinyl-7,7-dimethyl caprolactam; N-vinyl-7-ethyl caprolactam; N-vinyl-7,7-diethyl caprolactam and N-vinyl-7-methyl-7-ethyl caprolactam.

For the purpose of the present invention, we can employ polymers of N-vinyl lactams having a K-value of about 10 to about 140, which in terms of average molecular weight range from about 10,000 to about 1,000,000.

In carrying out the invention, the polymer of N-vinyl lactam is dissolved in water in any suitable fashion to provide a solution having a concentration of 0.00001 weight/volume percent to 1 weight/volume percent or from 0.1 to 10,000 parts per million of the polymer of N-vinyl lactam in water. Alternatively, the polymer of N-vinyl lactam may be dissolved in a brine solution or an aqueous solution of the polymer of N-vinyl lactam diluted with brine to form a solution having ionic constituents similar to or identical with those found in the water in the oil field wherein the secondary recovery process is employed.

The salt for preparing the brine solution may be any one of the alkali metal salts, such as lithium, sodium, potassium, rubidium, or caesium halides, nitrates, sulfates and the like or the salt may be an alkali metal salt plus a small portion of an alkaline earth salt such as magnesium, calcium, strontium, or barium halide, nitrate, sulfate, and the like.

The input well may be treated by a slug treatment wherein the aqueous solution of the polymeric N-vinyl lactam is employed for a short period of time, followed by conventional water containing no polymer. This treatment may be repeated as required. The input well may also be treated by adding continuously a low concentration of the polymeric N-vinyl lactam in brine water, or combinations of these treatments may be employed. In many oil fields, oil-field brine water is available, which can be treated with the polymer of N-vinyl lactam and employed as the injecting water. In the case where the input wells are offshore, sea water may be used as the injecting water with a polymer of N-vinyl lactam. It will be appreciated that each oil field must be treated in a particular fashion peculiar to the geology and mineralogy of the formation. Accordingly preliminary experiments on field material may be used to develop the proper treatment program that should be employed in the secondary recovery of oil.

In the case where no brine water is available at the oil field, ordinary water may be employed to form a solution of the polymers of N-vinyl lactam alone or a solution of the polymers and salts. In such case, it is desirable that the aqueous solutions contain the following components:

In the initial treatment, the water may contain from 0.1 to 10,000 parts per million of polymer of N-vinyl lactam, from 0 to 5% of alkali metal halide, and from 0 to 2% of alkaline earth halide.

In the continuous treatment, the aqueous solution may contain from 0.1 to 1,000 parts per million of polymer of N-vinyl lactam, from 0 to 5% of alkali metal salt and from 0 to 1% of alkaline earth salt.

The preferred compositions, however, should contain the following components:

(1) In the initial treatment, the aqueous solution should consists of from about 0.1 wt./vol. percent to 1 wt./vol. percent of polymer of N-vinyl lactam having a K-value of from about 20 to 100, 0 to 5 wt./vol. percent sodium chloride and from 0 to 0.1 wt./vol. percent of calcium chloride; and (2) In the continuous treatment, the aqueous solution should consist of 0.1 to 100 parts per million of polymer of N-vinyl lactam having a K-value of from about 20 to 100, 0 to 5 wt./vol. percent sodium chloride and from 0 to 0.1 wt./vol. percent of calcium chloride.

The ability of the polymers of N-vinyl lactams to maintain the permeability of oil-bearing formations to flood water was demonstrated in the following manner:

EXAMPLE I (A) Columns of uncompacted clay were prepared by supporting 50 grams of 10–30 mesh California low yield clay (Macco P–95) on a five gram sand base (Banding Sand, 80–100 mesh) in a glass column 30 cm. long and 2.6 cm. internal diameter. The first column was left untreated. The second through sixth columns were treated with varying concentrations of salt in distilled water by allowing 100 ml. of the treatment solution to percolate through the clay under gravity. The remaining columns were treated in a like fashion with 100 ml. of 1.4% NaCl solution in tap water containing, in addition, 1.0% and 0.1% of polymer of N-vinyl lactam.

After treatment, the flooding water, prepared by adding 1.4% NaCl to 60 p.p.m. of tap water, was passed under 5 p.s.i.g. through the treated columns. The volume of water passing through was recorded as a function of time and the total quantity passed in 30 minutes after initiation of flow was taken as the criterion of improved permeability. The data obtained are shown in Table 1.

(B) The uncompacted clay columns were prepared as in (A) above. The treating solutions contained, in addition to the polymer of N-vinyl lactam and 1.4% NaCl, 0.1% of CaCl$_2$. A total of 100 ml. of treatment solution was allowed to percolate through the column under gravity. Flooding water containing 1.4% NaCl was then passed through the column under 5 p.s.i.g. pressure. The volume of flood water was recorded as a function of time and the total quantity passed in 30 minutes after initiation of flow was taken as the criterion of improved permeability. The data obtained are also shown in Table 1.

EXAMPLE II

This example is similar to Example 1(A) with the exception that the clay was supported on a 200 mesh Monel screen instead of on the Banding Sand.

(A) The treating solution was prepared from distilled water and containing in addition to the polymer of N-vinyl lactam, 1.4% NaCl. 100 ml. of treating solution were allowed to percolate through the column under gravity. Flood water, containing 1.4% NaCl in 60 p.p.m. tap water, was passed through under 5 p.s.i.g. pressure. The volume collected was recorded as a function of time and the total flow during the first 30 minutes after initiation of flow was taken as the criterion of improved permeability. The data obtained are shown in Table 2.

(B) This example is similar to Example I(B). Calcium chloride, 0.1%, was added to the treating water in addition of 1.4% NaCl and polymer of N-vinyl lactam. The clay was supported on Monel screen instead of Banding Sand. The flood water was 1.4% NaCl in 60 p.p.m. tap water introduced to the column under 5 p.s.i.g. The total volume of flood water collected in 30 minutes was again taken as the criterion for improved permeability. They data obtained are also shown in Table 2.

EXAMPLE III

Columns of uncompacted clay were prepared by supporting 50 grams of 10–30 mesh California low yield clay (Macco P–95) on 200 mesh Monel screen. Two columns were treated with a solution of polyvinyl-2-pyrrolidone having a K-value of 90 by allowing 100 ml. of the treating solution to percolate through the clay under gravity. A 1% solution of polyvinyl-2-pyrrolidone having a K-value of 90 was used to treat the first column; a 0.1% solution of polyvinyl-2-pyrrolidone having a K-value of 90 was used to treat the second column. Six columns were treated with differing concentrations of either sodium chloride or calcium chloride by allowing 100 ml. of the proper solution to percolate under gravity through the column. Finally, four columns were treated with solutions containing both the polyvinyl-2-pyrrolidone having a K-value of 90 and salts; calcium chloride, magnesium chloride, sodium sulfate, and calcium nitrate were used to prepare the salt/polyvinyl-2-pyrrolidone solutions. In this case, 100 ml. of solutions containing 1% polyvinyl-2-pyrrolidone having a K-value of 90 and either 0.1% or 1.4% of the salt was allowed to percolate through the clay under gravity.

After treatment, flooding water, prepared by adding 1.4% NaCl to 60 p.p.m. tap water, was passed under 5 p.s.i.g. through the treated columns. The volume of water passing through was recorded as a function of the time and the total quantity passed in 30 minutes after initiation of flow was taken as the criterion of improved permeability. The data obtained are shown in Table 3.

TABLE 1.—FLOW OF FLOOD WATER THROUGH COLUMN IN 30 MINUTES

[Clay supported on Banding Sand]

| | Volume of flood water (ml.) collected in 30 minutes | |
|---|---|---|
| Treatment, percent, Wt./Vol. | With NaCl as indicated in treating water | With NaCl as indicated plus 0.1% CaCl₂ in treating water |
| None | [1] None | |
| 1% NaCl | None | |
| 1.4% NaCl | None | |
| 3% NaCl | None | |
| 5% NaCl | None | |
| 5% NaCl | 30 | |
| 5% KCl | 50 | |
| 1.4% NaCl plus: | | |
| 1% polyvinyl-2-pyrrolidone, K-60 | 1,310 | 2,145 |
| 0.1% polyvinyl-2-pyrrolidone, K-90 | 205 | 290 |
| 1% polyvinyl-2-pyrrolidone, K-90 | 4,790 | 4,940 |
| 0.1% polyvinyl-2-piperidone, K-50 | 155 | 165 |
| 0.1% polyvinyl-ε-caprolactam, K-90 | 130 | 140 |
| 0.1% polyvinyl succinimide, K-90 | 200 | 285 |
| 1.4% KCl plus: | | |
| 1% polyvinyl-2-pyrrolidone, K-60 | 1,390 | 2,250 |
| 1% polyvinyl-2-pyrrolidone, K-90 | 5,010 | 5,240 |

[1] In this case only, tap water was introduced to the column instead of 1.4% NaCl solution.

TABLE 2.—FLOW OF FLOOD WATER THROUGH COLUMN IN 30 MINUTES

[Clay supported on 200 mesh Monel screen]

| | Volume of flood water (ml.) collected in 30 minutes | |
|---|---|---|
| Treatment, percent, Wt./Vol. | With NaCl as indicated in treating water | With NaCl as indicated plus 0.1% CaCl₂ in treating water |
| 1.4% NaCl plus: | | |
| 1% polyvinyl-2-pyrrolidone, K-60 | 1,300 | 1,615 |
| 1% polyvinyl-2-pyrrolidone, K-90 | 10,850 | 10,725 |
| 1% polyvinyl-2-piperidone, K-112 | 4,300 | 4,270 |
| 1% polyvinyl-ε-caprolactam, K-120 | 2,700 | 2,500 |
| 1% polyvinyl succinimide, K-60 | 1,350 | 1,675 |

TABLE 3.—FLOW OF FLOOD WATER THROUGH COLUMN IN 30 MINUTES

Clay Supported on Monel Screen
Effect of Various Salts

| Treatment of column wt./vol. percent | Volume of flood water (ml.) collected in 30 minutes |
|---|---|
| 1% polyvinyl-2-pyrrolidone K-90 | 5 |
| 0.1% polyvinyl-2-pyrrolidone K-90 | 0 |
| 1.4% NaCl | 12 |
| 10% NaCl | 19 |
| 0.1% CaCl₂ | 0 |
| 1.0% CaCl₂ | 32 |
| 1.0% MgCl₂ | 31 |
| 3% CaCl₂ | 29 |
| 3% MgCl₂ | 30 |
| 5% CaCl₂ | 30 |
| 1% polyvinyl-2-pyrrolidone K-90 plus 0.1% CaCl₂ | 78 |
| 1% polyvinyl-2-pyrrolidone K-90 plus 0.1% MgCl₂ | 76 |
| 1% polyvinyl-2-pyrrolidone K-90 plus 1.4% CaCl₂ | 11605 |
| 1% polyvinyl-2-pyrrolidone K-90 plus 1.4% MgCl₂ | 10475 |
| 1% polyvinyl-2-pyrrolidone K-90 plus 1.4% Na₂SO₄ | 7000 |
| 1% polyvinyl-2-pyrrolidone K-90 plus 1.4% Ca(NO₃)₂ | 6600 |

From the data presented in Table 1, it is clearly manifest that the flooding medium containing the polymers of N-vinyl lactam substantially improve the permeability of the clay to the flooding water.

The data presented in Tables 2 and 3 clearly demonstrate that the addition of a small quantity of a divalent cation to the treating solution enhances the permeability of the clay to flood water.

The data in Table 3 demonstrates the unexpected effectiveness of the combination of salt and a polymer of N-vinyl lactam. The combination of a polymer of N-vinyl lactam having a K-value of from about 10 to 140 with either calcium chloride, magnesium chloride, sodium sulfate, calcium nitrate, or sodium chloride (see Table 1) give good flood rates which are at least 200 times greater than flood rates with the salt alone. The efficacy of both alkali metal and alkaline earth salts as shown in this table and the usefulness of halides, sulfates and nitrates is confirmed.

The following examples will show the very small concentrations of polymers of N-vinyl lactams absorbed onto the clays present in sandstone cores while maintaining excellent permeability of oil-bearing formations to flood waters.

EXAMPLE IV

Cylindrical cores were drilled from Berea Sandstone representative of that found in oil fields. Each core had a diameter of ¾" and a length of 1⅞". The pore volume of the cores was determined by saturation of the cores with 2% brine (sodium chloride) and found to be 2.7 cc. The cores were then encased in a rubber sleeve and the sleeves pressurized on the outside with nitrogen to confine the liquid within the cores. Pressure fittings were mounted on the opposite faces of the cores so that the desired liquids could be forced lengthwise through the cores. The cores were treated first with 2% sodium chloride solution to convert the clays present to the water-sensitive sodium clay. Permeability was measured at this point in terms of brine flow rate under a constant pressure differential of about 1.5 atmospheres, or about 22 p.s.i.g. The cores were then treated with solutions of polymers of N-vinyl lactams.

The treatment with the polymers solution of N-vinyl lactam was then followed by flooding with fresh water. The milliliters of water delivered through the core (at constant pressure) were recorded as a function of time and the flow rate (which under these conditions of constant pressure was proportional to permeability) was calculated.

This flow rate with fresh flood water was then referred to the original flow rate of 2% brine through the core in terms of percent retention of permeability. The data in Table 4 shows the retention of permeability when the core had been treated with polyvinyl-2-pyrrolidone (PVP) K-90 in fresh water. Table 5 shows the retention of permeability when the core had been treated with polyvinyl-2-pyrrolidone (PVP) K-90 in 2% brine solution. These data clearly indicate that polymers of N-vinyl lactams are very effective by themselves and that effectiveness is increased, especially at low polymer concentration, when the polymer is dissolved in a 2% brine solution.

TABLE 4.—PERCENT RETENTION PERMEABILITY
[PVP K-90 In fresh water]

| Vol. injected (cc.) | Percent retention (conc., p.p.m.) | | | | | |
|---|---|---|---|---|---|---|
| | 100 | 80 | 50 | 20 | 5 | 0 |
| 50 | 72 | 52 | 28 | 3 | 2 | 0.5 |
| 100 | 62 | 50 | 26 | 3 | 2 | 0.5 |
| 150 | 61 | 50 | 26 | 3 | 2 | 0.5 |
| 200 | 61 | 50 | 26 | 3 | 2 | 0.5 |

TABLE 5.—PERCENT PERMEABILITY RETENTION
[PVP K-90 in 2% NaCl]

| Vol. injected (cc.) | Percent retention (conc., p.p.m.) | | | | | |
|---|---|---|---|---|---|---|
| | 10 | 5 | 2 | 1 | 0.5 | 0 |
| 50 | 89 | 86 | 78 | 52 | 10 | 0.5 |
| 100 | 77 | 65 | 44 | 12 | 7 | 0.5 |
| 150 | 69 | 60 | 36 | 9 | 7 | 0.5 |
| 200 | 69 | 59 | 36 | 9 | 7 | 0.5 |
| 250 | 68 | 58 | 36 | 9 | 7 | 0.5 |

TABLE 5A.—PERCENT RETENTION OF PERMEABILITY AFTER 200 cc. INJECTION TREATMENT

| Viscosity grade of PVP in 2% NaCl solution | Percent retention (conc., p.p.m.) | | | |
|---|---|---|---|---|
| | 100 | 10 | 1 | 0 |
| K-30 | 72 | 50 | 8 | 0.5 |
| K-60 | 52 | 51 | 10 | 0.5 |
| K-90 | 68 | 69 | 9 | 0.5 |

Table 5A shows that various viscosity grades of PVP are extremely effective in retaining injectivity of flood water even at low PVP concentrations.

The superiority of polymers of N-vinyl lactams over other polymeric products is shown in Table 6, wherein the polymers of N-vinyl lactams are compared at 5 parts per million with 10 parts per million of polyacrylic acid of about 300,000 average molecular weight and a partially hydrolyzed polyacrylamide of about 30% hydrolysis having an average molecular weight of about 1,000,000.

TABLE 6
[Percent permeability retention of 5 p.p.m. of PVP vs. 10 p.p.m. of other Polymers in 2% NaCl]

| Injected vol. (cc.) | Percent retention | | |
|---|---|---|---|
| | PVP 5 p.p.m. | PAA 10 p.p.m. | Hyd-PA 10 p.p.m. |
| 50 | 87 | 90 | 76 |
| 100 | 63 | 75 | 44 |
| 150 | 61 | 56 | 28 |
| 200 | 60 | 40 | 12 |
| 250 | 59 | 40 | 12 |

Adsorption studies clearly indicate that very small concentrations of polymers of N-vinyl lactams adsorbed onto the clays present in the sandstone cores are very effective in giving the permeability retentions referred to above. For example, cores had been treated with 2% brine solution containing 1000 parts per million and 100 parts per million of polymer of N-vinyl-2-pyrrolidone having a K-value of 90. The core effluents from the polymer treatment and a subsequent brine wash were analyzed for polymer. The total polymer recovered in these solutions was compared with the polymer injected in order to determine the polymer retained in the core. The data obtained are summarized in the following Table 7, wherein the polymer of N-vinyl-2-pyrrolidone having a K-value of 90 is simply referred to as PVP K-90:

TABLE 7.—RETENTION OF PVP K-90 ON BEREA SANDSTONE CORES

| Conc. of PVP in p.p.m. in treating solution | Total PVP, mg. | | | Percent retained | PVP per pore volume | |
|---|---|---|---|---|---|---|
| | Injected | Recovered | Retained | | Mg./cc. | Lbs./bbl. |
| 1,000 | 37.57 | 17.24 | 20.33 | 54 | 8.44 | 2.95 |
| 100 | 3.67 | 2.61 | 1.07 | 29 | 0.508 | 0.176 |

While the foregoing examples show the effectiveness of homopolymers of N-vinyl lactams, we have also found that copolymers containing from 50 to 99 mole percent of N-vinyl lactam and from 1 to 50 mole percent of a copolymerizable monomer, such as acrylamide, vinyl acetate, vinyl chloride, acrylic acid and the like in aqueous solution also improve the flow rate of injecting water through oil-bearing formations containing water-sensitive clays during secondary recovery of petroleum oil. The data obtained with some of such copolymers having an average molecular weight of between 180,000 and 300,000 are shown in the following Table 8:

TABLE 8.—FLOW OF FLOOD WATER THROUGH COLUMN IN 30 MINUTES
[Clay supported on banding sand]

| Treatment | Volume of flood water (ml.) collected in 30 minutes | |
|---|---|---|
| | With NaCl as indicated in treating water | With NaCl as indicated plus 0.1% CaCl₂ in treating water |
| None | [1] None | None |
| 1 NaCl | None | None |
| 1.4% NaCl | None | None |
| 3% NaCl | None | None |
| 5% NaCl | 30 | |
| 5% KCl | 50 | |
| 1.4% NaCl plus: | | |
| 1% of 60/40 N-vinyl-2-pyrrolidone/ acrylamide copolymer | 3,400 | 4,550 |
| 1% of 70/30 N-vinyl-2-pyrrolidone/ acrylamide copolymer | 4,600 | 5,125 |
| 1% of 80/20 N-vinyl-2-pyrrolidone/ acrylamide copolymer | 3,450 | 4,570 |
| 1% of 85/15 N-vinyl-2-pyrrolidone/ acrylamide copolymer | 3,790 | 4,075 |
| 1% of 85/15 N-vinyl succinimide acrylamide copolymer | 3,740 | 4,050 |

[1] In this case only, tap water was introduced to the column instead of 1.4% NaCl solution.

We claim:

1. In a process of secondary recovery of petroleum from a subterranean oil-bearing formation containing water-sensitive clays by the water-flooding method in which the flooding water is injected through an input well penetrating said formation toward an output well from which the petroleum is recovered, the improvement which comprises increasing the injectivity of the flood water by including therein
    (1) a water soluble polymer of an N-vinyl lactam having a K-value of from about 10 to 140, and
    (2) a water soluble alkaline earth metal salt.

2. In a process of secondary recovery of petroleum from a subterranean oil-bearing formation containing water-sensitive clays by the water-flooding method in which the flooding water is injected through an input well penetrating said formation toward an output well from which the petroleum is recovered, the improvement which comprises increasing the injectivity of the flood water by including therein
    (1) a water soluble polymer of an N-vinyl lactam having a K-value of from about 10 to 140,
    (2) a water soluble alkaline earth metal salt and
    (3) a water soluble alkali metal salt.

3. The process according to claim 2 wherein the water-soluble polymer of N-vinyl lactam is the polymer of N-vinyl-2-pyrrolidone.

4. The process according to claim 2 wherein the water-soluble polymer of N-vinyl lactam is the polymer of N-vinyl-2-piperidone.

5. The process according to claim 2 wherein the water-soluble polymer of N-vinyl lactam is the polymer of N-vinyl-ε-caprolactam.

6. The process according to claim 2 wherein the water-soluble polymer of N-vinyl lactam is the copolymer of from 50 to 99 mole percent of N-vinyl-2-pyrrolidone and from 1 to 50 mole percent of acrylamide.

7. The process according to claim 2 wherein the water-soluble polymer of N-vinyl lactam is the polymer of N-vinyl-succinimide.

8. The process according to claim 2 wherein the water-soluble polymer of N-vinyl lactam is the polymer of N-vinyl-2-pyrrolidone having a K-value of 90.

References Cited

UNITED STATES PATENTS

| | | | |
|---|---|---|---|
| 2,761,837 | 9/1956 | Brown et al. | |
| 3,016,352 | 1/1962 | Hessel | 166—9 X |
| 3,020,953 | 2/1962 | Zerweck et al. | 166—9 X |
| 3,179,171 | 4/1965 | Beale | 166—42 |
| 3,208,528 | 9/1965 | Elliott et al. | 166—42 |
| 3,294,765 | 12/1966 | Hort et al. | |

OTHER REFERENCES

Moore, John E. How to Combat Swelling Clays. In The Petroleum Engineer, March, 1960, pp. B–96, –98 and –99 relied on (Copy in 166–9).

CHARLES E. O'CONNELL, Primary Examiner

I. A. CALVERT, Assistant Examiner

U.S. Cl. X.R.

166—305